United States Patent
Kim et al.

(10) Patent No.: US 10,930,267 B2
(45) Date of Patent: Feb. 23, 2021

(54) SPEECH RECOGNITION METHOD AND APPARATUS THEREFOR

(71) Applicant: SAMSUNG SDS CO., LTD., Seoul (KR)

(72) Inventors: Min Soo Kim, Seoul (KR); Ji Hyeon Seo, Seoul (KR); Kyung Jun An, Seoul (KR); Seung Kyung Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 197 days.

(21) Appl. No.: 16/007,508

(22) Filed: Jun. 13, 2018

(65) Prior Publication Data
US 2019/0005947 A1  Jan. 3, 2019

(30) Foreign Application Priority Data
Jun. 30, 2017  (KR) .................. 10-2017-0082985

(51) Int. Cl.
*G10L 15/16* (2006.01)
*G10L 15/22* (2006.01)
*G10L 15/06* (2013.01)
*G10L 13/00* (2006.01)

(52) U.S. Cl.
CPC .............. *G10L 15/16* (2013.01); *G10L 13/00* (2013.01); *G10L 15/063* (2013.01); *G10L 15/22* (2013.01)

(58) Field of Classification Search
CPC ..... G10L 15/16; G10L 13/043; G10L 15/063; G10L 15/22
See application file for complete search history.

(56) References Cited

U.S. PATENT DOCUMENTS

2015/0243285 A1* 8/2015 Lane ................. G10L 15/22
704/256.1
2017/0125020 A1* 5/2017 Seo ................... G10L 15/144

FOREIGN PATENT DOCUMENTS

KR   10-2016-0122564 A   10/2016

* cited by examiner

*Primary Examiner* — Nafiz E Hoque
(74) *Attorney, Agent, or Firm* — Sughrue Mion, PLLC

(57) ABSTRACT

Provided is a speech recognition method for a recognition target language. According to an embodiment of the inventive concept, a speech recognition method for a recognition target language performed by a speech recognition apparatus includes obtaining an original learning data set for the recognition target language, constructing a target label by dividing the text information included in each piece of original learning data in letter units, and building an acoustic model based on a deep neural network by learning the learning speech data included in the each piece of original learning data and the target label corresponding to the learning speech data.

13 Claims, 11 Drawing Sheets

| | SPEECH SIGNAL | TARGET LABEL |
|---|---|---|
| ORIGINAL LEARNING DATA(310a) | —◁◎▷— | 안녕 반가워요 |
| LEARNING DATA(330a) | —◁◎▷— | ㅇㅏㄴㄴㅕㅇ$ㅂㅏㄴㄱㅏㅇㅝㅇㅛ |
| LEARNING DATA(350a) | —◁◎▷— | [ㅇ]ㅏㄴㄴㅕㅇ$ㅂㅏㄴㄱㅏ[ㅇ]ㅝ[ㅇ]ㅛ |
| LEARNING DATA(370a) | —◁◎▷— | ㅇㅏ<ㄴ>ㄴㅕ<ㅇ>$ㅂㅏ<ㄴ>ㄱㅏㅇㅝㅇㅛ |
| LEARNING DATA(390a) | —◁◎▷— | [ㅇ]ㅏ<ㄴ>ㄴㅕ<ㅇ>$ㅂㅏ<ㄴ>ㄱㅏ[ㅇ]ㅝ[ㅇ]ㅛ |

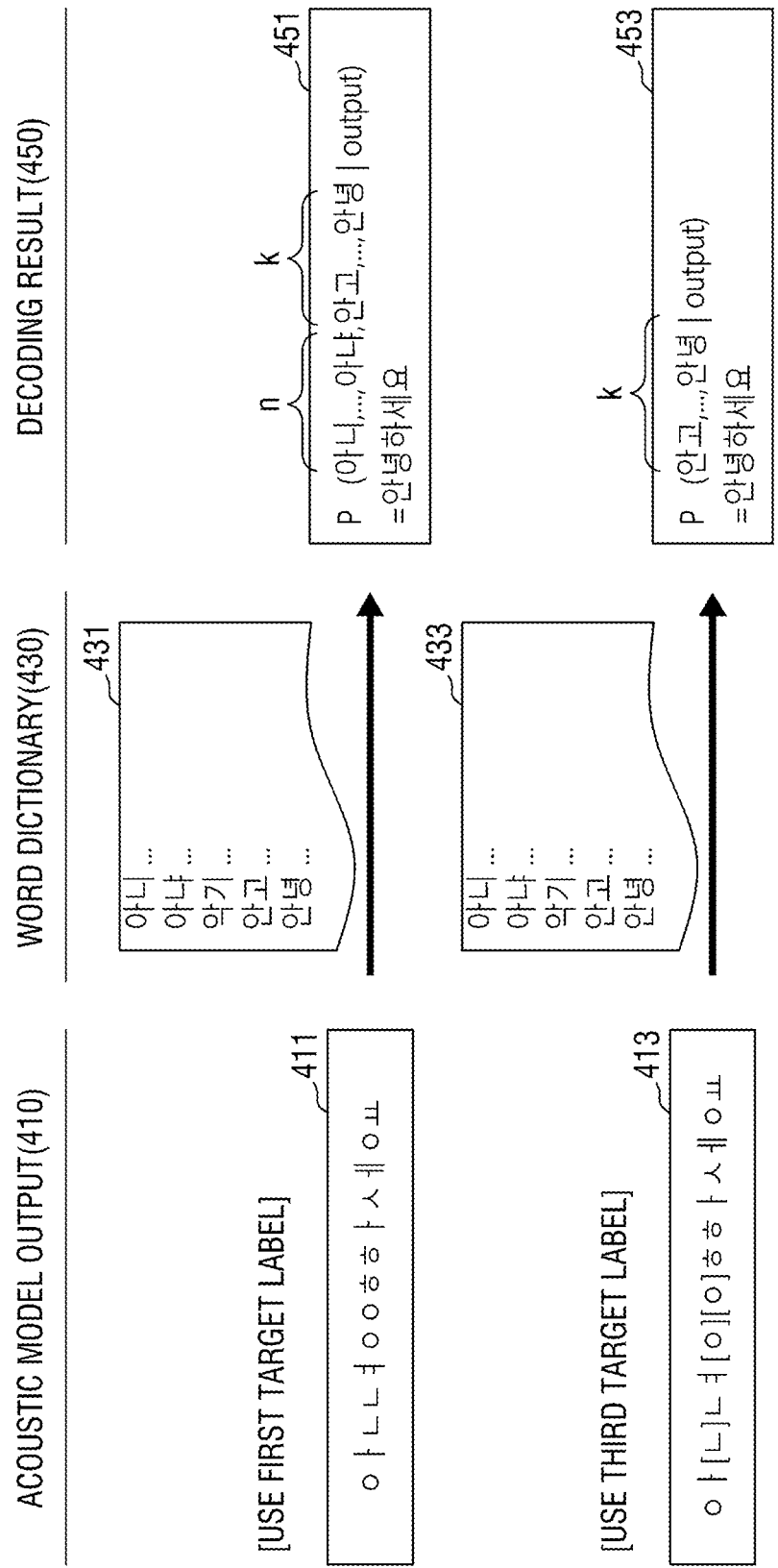

SPEECH RECOGNITION METHOD AND APPARATUS THEREFOR

This application claims priority from Korean Patent Application No. 10-2017-0082985, filed on Jun. 30, 2017 in the Korean Intellectual Property Office, the disclosure of which is incorporated herein by reference in its entirety.

BACKGROUND

1. Field of the Disclosure

The inventive concept relates to a speech recognition method and an apparatus therefor. More particularly, the inventive concept relates to a method of building an acoustic model based on a deep neural network to improve the accuracy of end-to-end speech recognition and recognizing speech input using the built acoustic model, and an apparatus therefor.

2. Description of the Related Art

A speech recognition technique refers to a technique in which an acoustic speech signal, such as speech uttered by human, is recognized or understood through analysis using a computing device. Conventionally, a method of recognizing speech using frequency characteristics extracted from speech data has been mainly used, and a hidden Markov model (HMM) has been mainly used in the above method. In the HMM-based speech recognition method, pronunciation of speech is analyzed from speech data, and the speech is recognized by a process of combining words or sentences on the basis of the analyzed pronunciation.

Recently, as deep learning based machine learning techniques mature, research is actively underway on end-to-end speech recognition techniques in which text, such as words or sentences, is directly recognized from speech data without a process of analyzing pronunciation from the speech data using an acoustic model composed of a deep neural network.

However, end-to-end speech recognition techniques proposed so far are used for learning a target label constructed in letter units without distinction of consonants and vowels which are combined even when a recognition target language is a combinatorial language expressing one syllable in a combination of letters. For example, in order to recognize Korean speech, an acoustic model is built by learning a target label in which the same letter is defined as a class regardless of arrangement in an initial consonant position, a medial consonant position, or a final consonant position. However, in the acoustic model built in this manner, there is a problem in that the accuracy of speech recognition is lowered because structural characteristics of a recognition target language in which a syllable is composed of a combination of an initial consonant, a medial consonant, and a final consonant cannot be reflected.

Therefore, in order to improve the accuracy of end-to-end speech recognition, there is a need for a speech recognition method in which an acoustic model is learned by reflecting structural characteristics of a recognition target language.

SUMMARY

Aspects of the inventive concept provide a method of performing speech recognition using a deep neural network-based acoustic model, and an apparatus for performing the method.

Aspects of the inventive concept also provide a method of learning a deep neural network-based acoustic model by reflecting structural characteristics of a recognition target language, and an apparatus for performing the method.

Aspects of the inventive concept also provide a method of generating a learning data set to which structural characteristics of a recognition target language are reflected, and an apparatus for performing the method.

Aspects of the inventive concept also provide a method of effectively learning a deep neural network-based acoustic model using a learning data set to which structural characteristics of a recognition target language are reflected, and an apparatus for performing the method.

Aspects of the inventive concept also provide a method of building an optimal acoustic model suitable for each recognition target language using a plurality of learning data sets to which structural characteristics of the recognition target language are reflected, and an apparatus for performing the method.

It should be noted that objects of the inventive concept are not limited to the above-described objects, and other objects of the inventive concept will be apparent to those skilled in the art from the following descriptions.

In a speech recognition method according to an embodiment of the inventive concept, it is possible to construct a target label to which a principle of language combination is reflected and to learn the constructed target label.

BRIEF DESCRIPTION OF THE DRAWINGS

The above and other aspects and features of the present disclosure will become more apparent by describing in detail exemplary embodiments thereof with reference to the attached drawings, in which:

FIG. 7 is a view for describing a decoding unit, which is a component of the speech recognition apparatus;

DETAILED DESCRIPTION OF THE EMBODIMENTS

Figure 1:
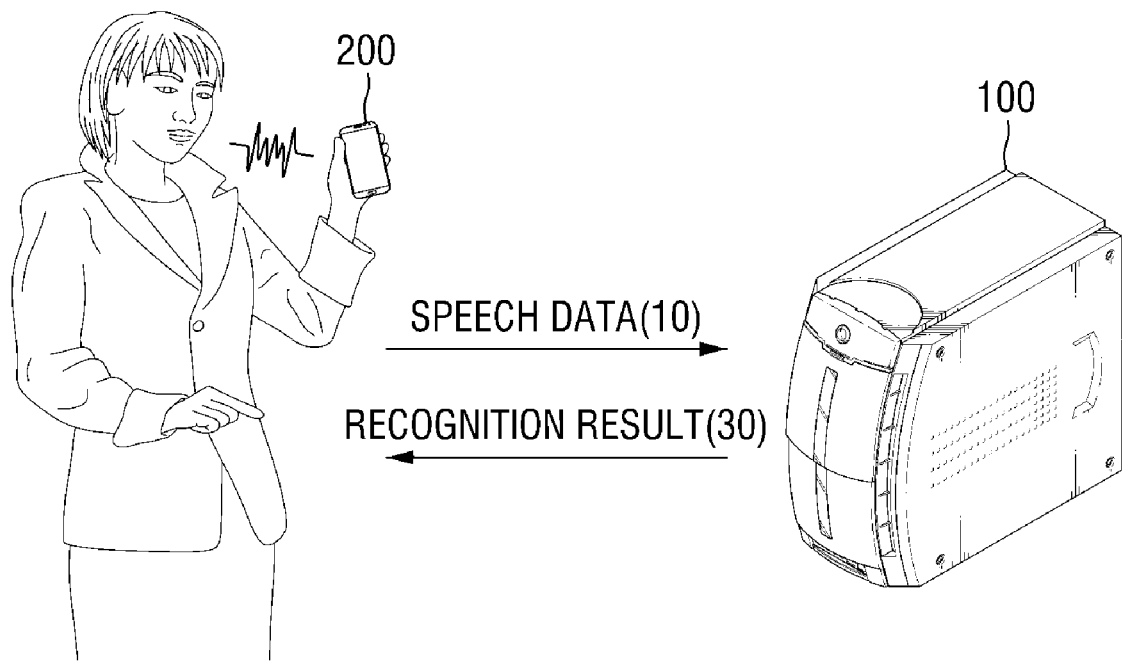
FIG. 1 is a schematic diagram of a speech recognition system according to an embodiment.

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Prior to description of this specification, some terms to be used herein will be clarified.

In this specification, "letter" refers to signify individual letter instances found in the text information and letter type. The expression "letter type" refers to signify individual letters found in the alphabet of a given language. For example, the word "telephone" may be said to consist of 9 "letters" and 6 "letter types" (e.g., t, e, l, p, h, n).

In this specification, an acoustic model refers to a model representing statistical pattern information for combining sounds into pronunciations of sounds or words. However, a deep neural network-based acoustic model which is built according to an embodiment of the inventive concept for end-to-end speech recognition can be performed by a model for directly outputting text without performing a process of converting a sound into a pronunciation.

In this specification, a loss function refers to a function for obtaining a loss between a prediction value and a target value of a learning model. In end-to-end speech recognition, a loss between a prediction value and a target label of a deep neural network-based acoustic model to which speech data is input is calculated, and learning is performed to minimize the loss.

In this specification, decoding refers to a process of combining letters, syllables, words, etc. in order to output final text in consideration of statistical results of an acoustic model.

In this specification, a target label refers to result data obtained by recognizing speech data. A deep neural network-based acoustic model, which is built according to the embodiment of the inventive concept, learns learning data composed of speech data and a target label corresponding to the speech data and outputs a predicted target label when recognition target speech data is input.

Hereinafter, some embodiments of the inventive concept will be described in detail with reference to the accompanying drawings.

FIG. 1 is a schematic diagram of a speech recognition system according to an embodiment of the inventive concept.

Referring to FIG. 1, the speech recognition system may include a user terminal 200 and a speech recognition apparatus 100. It should be understood, however, that such a configuration is only an exemplary embodiment for achieving the objects of the inventive concept, and that some components may be added or removed as necessary. Further, it should be noted that the respective components of the speech recognition system shown in FIG. 1 represent functional components which are functionally distinguished, and that at least one component may be implemented as being integrated with another in an actual physical environment. For example, although the speech recognition apparatus 100 is shown as being a kind of server apparatus in FIG. 1, respective functions of the speech recognition apparatus 100 may be implemented to be embedded in the user terminal 200 in some embodiments.

In the speech recognition system, the user terminal 200 is a terminal which receives a speech signal from a user as an input and provides a recognition result to be recognized by the speech recognition apparatus 100. In FIG. 1, the user terminal 200 is shown as being a smartphone, but may be implemented with any device.

In the speech recognition system, the speech recognition apparatus 100 is a computing device which receives speech data 10 as an input and provides a recognition result 30. Here, the term speech data may include all of a wave file representing a speech signal in a wave form, a spectrogram representing the wave file in a frequency form, a Mel-frequency cepstral coefficient (MFCC), and the like. Further, the computing device may be a notebook PC, a desktop computer, a laptop PC, a smartphone, or the like, but the inventive concept is not limited thereto, and the computing device may include any kind of device having a computing means.

According to the embodiment of the inventive concept, in order to provide end-to-end speech recognition, the speech recognition apparatus 100 may build an acoustic model composed of a deep neural network and provide the recognition result 30 for the speech data 10 using the built acoustic model. Here, the deep neural network may include, for example, a recurrent neural network (RNN), a bi-directional RNN (BRNN), a long short term memory (LSTM), a bi-directional LSTM (BLSTM), a gated recurrent unit (GRU), a bi-directional GRU (BGRU), or the like, but the inventive concept is not limited thereto.

Further, according to the embodiment of the inventive concept, the speech recognition apparatus 100 may construct a target label such that structural characteristics of a recognition target language are reflected from text included in an original learning data set and perform learning on the acoustic model using learning speech data included in the original learning data set and a target label corresponding to the learning speech data. Accordingly, the deep neural network-based acoustic model which learns the structural characteristics of the recognition target language may be built, and the accuracy of the end-to-end speech recognition may be improved. A detailed description thereof will be described below with reference to FIGS. 4 to 7.

Until now, the speech recognition system according to the embodiment of the inventive concept has been described with reference to FIG. 1. Next, a configuration and an operation of the speech recognition apparatus 100 according to the embodiment of the inventive concept will be described with reference to FIGS. 2 to 8.

First, in order to facilitate understanding, examples of input and output data of the speech recognition apparatus 100 will be briefly described with reference to FIG. 2.

Figure 2:
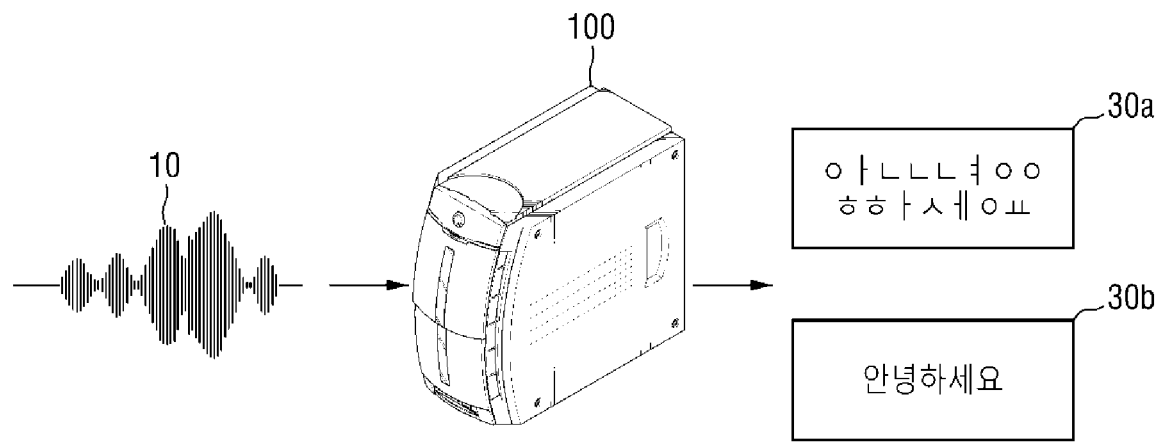
FIG. 2 is a view for describing input and output data of a speech recognition apparatus according to an embodiment.

Referring to FIG. 2, when speech data 10 indicating " 안녕하세요 " is input, the speech recognition apparatus 100 may output recognition results 30a and 30b for the speech data 10. Here, the recognition result 30a shows an example of a target label predicted by the above-described acoustic model, and the recognition result 30b shows final text decoded based on the predicted target label. Here, the speech recognition apparatus 100 may utilize a predefined word dictionary to derive the final text from the target label. A description thereof will be described below with reference to FIG. 7.

Hereinafter, a block diagram of the speech recognition apparatus 100 according to the embodiment of the inventive concept will be described with reference to FIG. 3.

Figure 3:
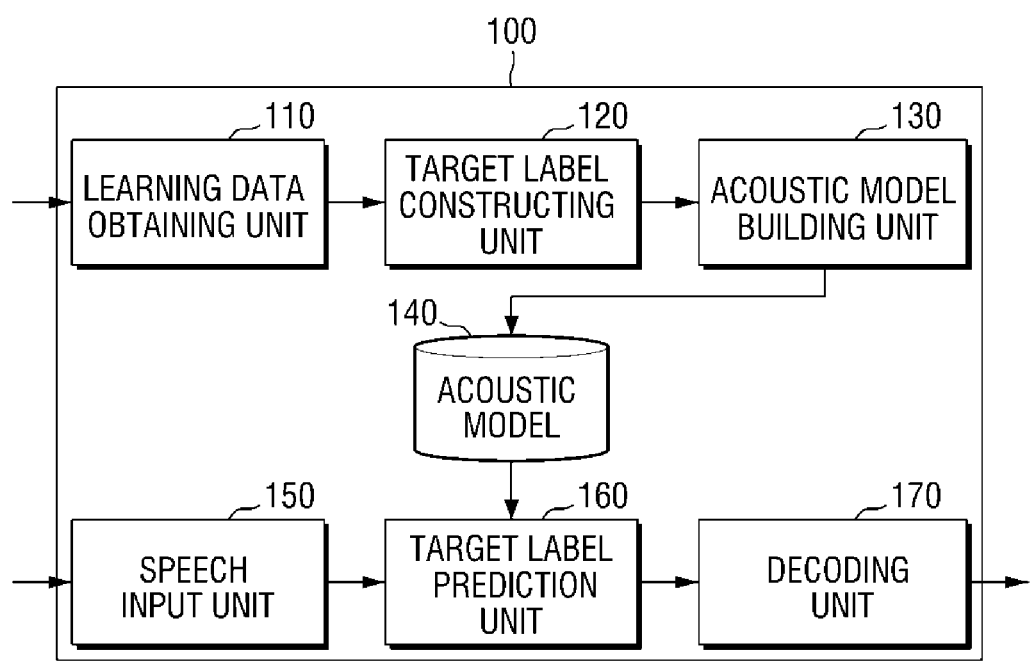
FIG. 3 is a block diagram showing a speech recognition apparatus according to another embodiment.

Referring to FIG. 3, the speech recognition apparatus 100 may include a learning data obtaining unit 110, a target label constructing unit 120, an acoustic model building unit 130, a speech input unit 150, a target label prediction unit 160, and a decoding unit 170. However, in FIG. 3, only components associated with the embodiment of the inventive concept are shown. Therefore, it may be seen by those of ordinary skill in the art that the inventive concept may further include other general components in addition to the components shown in FIG. 3. Further, it should be noted that the respective components of the speech recognition apparatus shown in FIG. 3 show functional elements which are functionally distinguished, and that at least one component may be implemented to be integrated with another in an actual physical environment. Hereinafter, each component of the speech recognition apparatus 100 will be described.

The learning data obtaining unit 110 obtains an original learning data set used for constructing a target label. Each piece of original learning data included in the original learning data set may include learning speech data and text corresponding to the learning speech data. For example, the original learning data may be data composed of a pair of learning speech data and text, indicating " 안녕하세요 ."

The learning data obtaining unit 110 may obtain the original learning data set by any method. For example, the learning data obtaining unit 110 may obtain a pre-stored original learning data set from a local storage or obtain the original learning data set from an external storage.

The target label constructing unit 120 constructs the target label from the text included in the original learning data set so that the structural characteristics of the recognition target language are reflected and generates a learning data set, which is composed of the learning speech data included in the original learning data set and the target label. For example, when the recognition target language is a combinatorial language such as Korean, the target label may be constructed so that even the same letters may be distinguished according to arrangement positions of the letters. Hereinafter, a function of the target label constructing unit 120 will be described in more detail with reference to FIG. 4.

Figure 4:
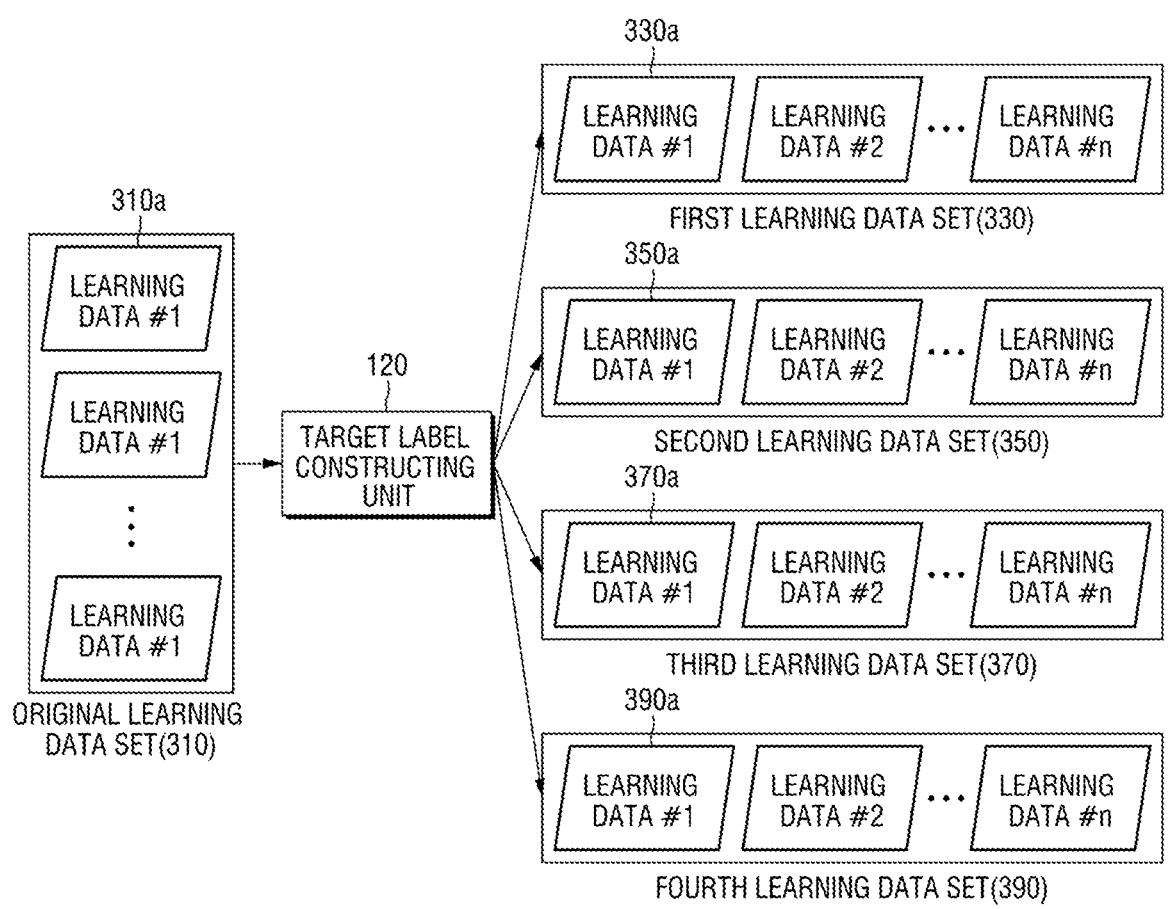
FIGS. 4 and 5 are diagrams for describing a target label constructing unit, which is a component of the speech recognition apparatus.

Referring to FIG. 4, the target label constructing unit 120 may construct various types of target labels from text included in an original learning data set 310 and generate learning data sets 330, 350, 370, and 390 each including learning speech data included in the original learning data set 310 and the constructed target labels. The learning data sets 330, 350, 370, and 390 are learning data sets used for learning an actual acoustic model, and the respective learning data sets are composed of different types of target labels.

Particularly, the target label constructing unit 120 may divide the text included in the original learning data set 310 in letter units and construct a target label of four levels (hereinafter, referred to as "a first level," "a second level," "a third level," and "a fourth level" to distinguish the respective levels) to which the structural characteristics of the recognition target language are reflected in a manner to be described below.

In FIG. 4, a first learning data set 330 indicates a plurality of pieces of learning data which are composed of the learning speech data included in the original learning data set and a first level target label, and second, third, and fourth learning data sets 350, 370, and 390 indicate a plurality of pieces of learning data which are respectively composed of the learning speech data included in the original learning data set and second, third, and fourth level target labels. Hereinafter, a method of constructing, by the target label constructing unit 120, the first to fourth level target labels so that the structural characteristics of the recognition target language are reflected will be described. Hereinafter, it is assumed that the recognition target language is Korean. However, this is only for convenience of understanding, and the scope of the inventive concept is not limited thereto.

A first level target label included in learning data 330a may be constructed as letters and spaces which may express the recognition target language. That is, the target label constructing unit 120 may divide text included in learning data 310a in letter units and according to the spaces, thereby constructing the first level target label. Here, different class identifiers are assigned to different letters among the letters included in the first level target label of the learning data 330a, so that different letters may be defined as different classes in the deep neural network-based acoustic model. Further, the spaces may be defined as a separate class so as to be distinguished from the letters.

Figures 5, 6A:
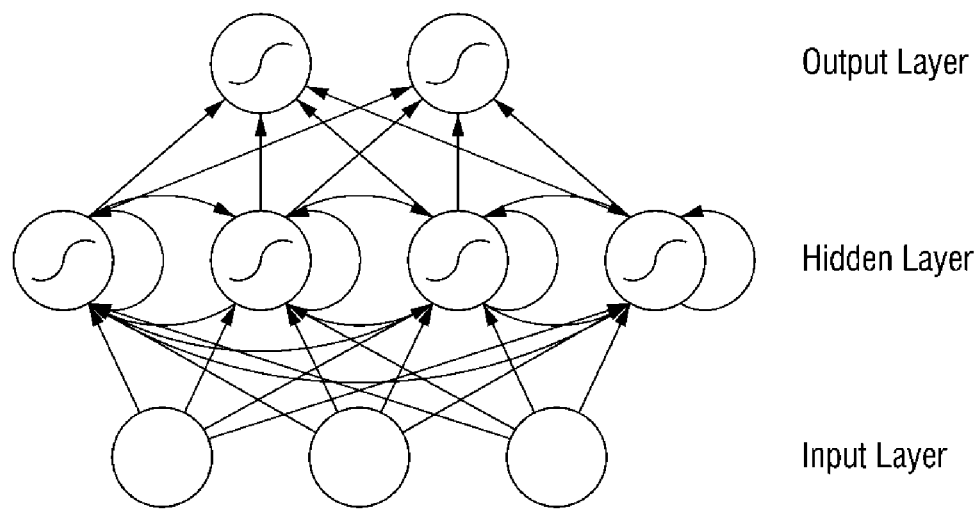
FIGS. 6A and 6B are views of examples of a deep neural network which can be used for building an acoustic model in some embodiments.
Figure 6B:
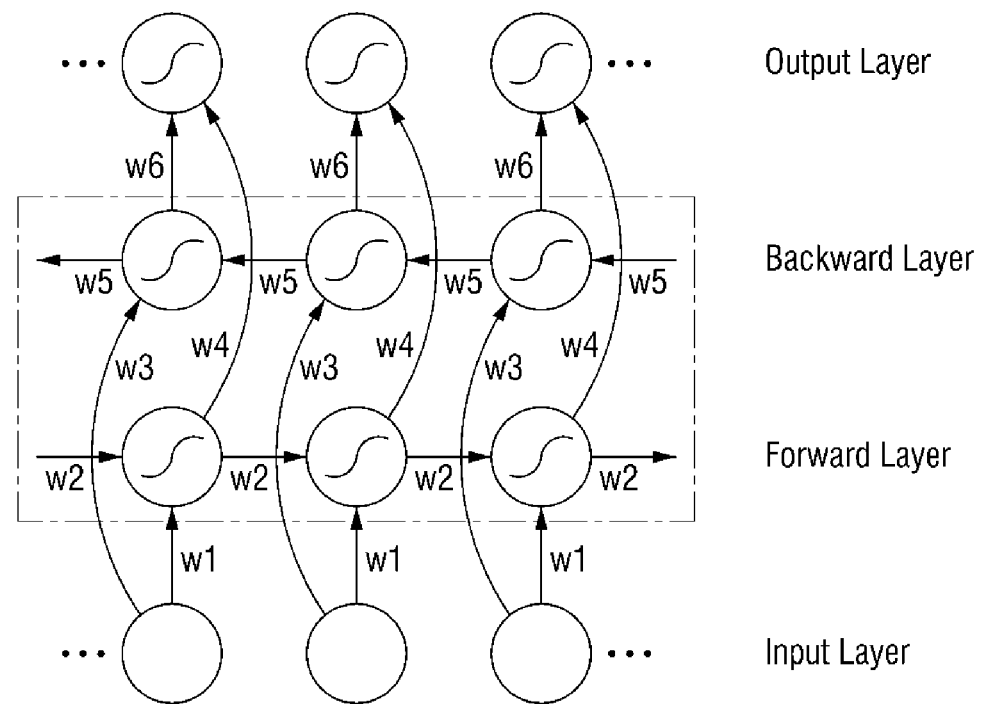

For example, as shown in FIG. 5, when the text of the learning data 310a is " 안녕 반가워요 ," the first level target label of the learning data 330a may be constructed as " ㅇㅏㄴㄴㅕㅇ$ㅂㅏㄴㄱㅏㅇㅝㅇㅛ ." Here, a symbol "$" represents a space.

As another example, in the case in which the recognition target language is English in which a letter itself is used as a single character, when the text of the learning data 310a is "nice to meet you," the first level target label of the learning data 330a may be constructed as "nice$to$meet$you."

Next, a second level target label included in learning data 350a may be constructed as letters and spaces which may express the recognition target language. In this case, even in the case of the same letters, in order to distinguish and learn a pronounced letter from an un-pronounced letter (e.g., a silent letter), the pronounced letter and the un-pronounced letter may be defined as different classes. That is, the target label constructing unit 120 may divide the text included in the learning data 310a in letter units and according to the spaces, identify the un-pronounced letter as a separate letter, and construct the second level target label. When the recognition target language is Korean, the un-pronounced letter may be, for example, a consonant " ㅇ " of which an arrangement position is an initial consonant position.

For example, as shown in FIG. 5, when the text of the learning data 310a is " 안녕 반가워요 ," the second level target label of the learning data 350a may be constructed as "[o]ㅏㄴㄷㅕㅇ$ㅂ ㅏㄴㄱㅏ[o]ㅝ[o]ㅛ." Here, a symbol "H" indicates that the corresponding letter is a silent letter.

When the recognition target language is English, a letter "k" that precedes a letter "n," a letter "w" that precedes a letter "r," a letter "g" that precedes a letter "n," or the like in text may be processed as a silent letter. For example, when the text of the learning data 310a is "i know you are wrong," the second level target label may be constructed as "i$[k]now$you$are$[w]rong." In addition, the un-pronounced letter may be defined to be recognized as a different class in the acoustic model by various silent letter rules.

Next, a third level target label included in learning data 370a may be constructed as letters and spaces which may express the recognition target language. However, unlike the first level target label included in the learning data 330a, different class identifiers may be assigned to different letters, and different class identifiers may be assigned according to arrangement positions of the letters even in the case of the same letters. For example, when the recognition target language is Korean, letters which are used at positions of an initial consonant and a final consonant may be defined as different classes. This may be understood to reflect the structural characteristics of Korean in which one syllable is formed with a combination of an initial consonant, a medial consonant, and a final consonant. For example, even in the case of the same letters "ㅇ," different class identifiers may be assigned to a letter "ㅇ" located at an initial consonant and a letter "ㅇ" located at a final consonant.

Particularly, for example, as shown in FIG. 5, when the text of the learning data 310a is "안녕 반가워요," the third level target label of the learning data 370a may be constructed as "ㅇ ㅏ<ㄴ>ㄴ ㅕ<ㅇ>$ㅂ ㅏ<ㄴ>ㄱ ㅏㅇㅝㅇㅛ." Here, since a letter "ㅇ" and a letter "<ㅇ>" or a letter "ㄴ" and a letter "<ㄴ>" are the same letters but have different arrangement positions, different class identifiers are assigned thereto. Here, a symbol "<>" is a symbol used for distinguishing and representing the same letters having different arrangement positions.

Even when the recognition target language is English, the same letters may be defined as different classes according to arrangement positions of the letters. For example, when a letter "c" precedes a letter "a," "o," or "u," the letter "c" is pronounced as a /k/ sound like in "cake," "cube," or "con," and when a letter "c" precedes a letter "i," "e," or "y," the letter "c" is pronounced as an /s/ sound like in "city," "center," or "cycle." As described above, different class identifiers may be assigned to the letters to distinguish the letters according to the predetermined rules that pronunciations are different according to arrangement positions of the letters. More particularly, for example, text such as "you can buy a cell phone" is divided in letter units, and then the third level target label may be constructed as "you$can$buy$a$<c>ell$phone" in consideration of arrangement positions of the letters. In addition, the target label may be constructed in various ways by distinguishing the letters according to the rule that sounds of letters are distinguished according to arrangement positions of the letters.

Next, a fourth level target label of learning data 390a may be constructed as letters and spaces which may express the recognition target language, and a target label may be constructed so that arrangement positions of the letters and whether the letters are pronounced may both be distinguished. That is, unlike the second level target label included in the learning data 350a, different class identifiers may be assigned to different letters, and different class identifiers may be assigned to the same letters having different arrangement positions.

For example, as shown in FIG. 5, the text of the learning data 310a is "안녕 반가워요," the fourth level target label of the learning data 390a may be constructed as "[o]ㅏ<ㄴ>ㄴ ㅕ<o>$ㅂ ㅏ<ㄴ>ㄱ ㅏ[o]ㅝ[o]ㅛ." Here, since a letter "ㅇ" and a letter "<ㅇ>" or a letter "ㄴ" and a letter "<ㄴ>" are the same letters but have different arrangement positions, different class identifiers may be assigned thereto, and different class identifiers may be assigned to a pronounced letter "ㅇ" and an un-pronounced letter "[ㅇ]."

When the recognition target language is English, the text "i know you can buy a cell phone" is divided in letter units, and then the fourth target label may be constructed as "i$[k]now$you$can$buy$a$<c>ell$phone" in consideration of silent letters and arrangement positions of the letters.

Table 1 below summarizes classes for labels which may constitute the target labels of the learning data set when the recognition target language is Korean or English.

TABLE 1

| Item | Description | Language | Class for label |
|---|---|---|---|
| First Level Target Label | Composed of Letters and Spaces | Korean | 41 Letters (ㄱ,ㄲ,ㄳ,ㄴ,ㄵ,ㄶ,ㄷ,ㄸ,ㄹ, ㄺ,ㄻ,ㄼ,ㄽ,ㄾ,ㄿ,ㅀ,ㅁ,ㅂ,ㅃ,ㅄ,ㅅ, ㅆ,ㅇ,ㅈ,ㅉ,ㅊ,ㅋ,ㅌ,ㅍ,ㅎ,ㅏ,ㅑ, ㅐ,ㅓ,ㅔ,ㅕ,ㅖ,ㅗ,ㅘ,ㅙ,ㅚ,ㅛ,ㅜ,ㅝ, ㅞ,ㅟ,ㅠ,ㅡ,ㅢ, and ㅣ) 1 Space ($) |
| | | English | 26 Letters (a, b, c, d, e, f, g, h, i, j, k, l, m, n, o, p, q, r, s, t, u, v, w, x, y, and z) 1 Space ($) 1 Symbol (') |
| Second Level Target Label | Composed of Letters and Spaces, and Distinction of Letters according to Silent Letter Rule | Korean | 41 Letters (ㄱ,ㄲ,ㄳ,ㄴ,ㄵ,ㄶ,ㄷ,ㄸ,ㄹ, ㄺ,ㄻ,ㄼ,ㄽ,ㄾ,ㄿ,ㅀ,ㅁ,ㅂ,ㅃ,ㅄ,ㅅ, ㅆ,ㅇ,ㅈ,ㅉ,ㅊ,ㅋ,ㅌ,ㅍ,ㅎ,ㅏ,ㅑ, ㅐ,ㅓ,ㅔ,ㅕ,ㅖ,ㅗ,ㅘ,ㅙ,ㅚ,ㅛ,ㅜ,ㅝ ㅞ,ㅟ,ㅠ,ㅡ,ㅢ, and ㅣ) 1 Silent Letter ([ㅇ]) 1 Space ($) |
| | | English | 26 Letters (a, b, c, d, e, f, g, h, i, j, k, l, m, n, o, p, q, r, s, t, u, v, w, x, y, and z) n Silent Letters ([k]), [w], [g], and [p], in addition, more letters can be added |

TABLE 1-continued

| Item | Description | Language | Class for label |
|---|---|---|---|
| | | | according to a silent letter rule)<br>1 Space ($)<br>1 Symbol (') |
| Third Level Target Label | Composed of Letters and Spaces, and Distinction of Letters according to Arrangement Positions | Korean | 19 Initial Consonantal Letters (ㄱ,ㄲ,ㄴ,ㄷ,ㄸ,ㄹ, ㅁ,ㅂ,ㅃ,ㅅ,ㅆ,ㅇ,ㅈ,ㅉ,ㅊ,ㅋ,ㅌ,ㅍ, and ㅎ)<br>21 Medial Consonantal Letters (ㅏ,ㅐ,ㅑ,ㅒ,ㅓ,ㅔ,ㅕ, ㅖ,ㅗ,ㅘ,ㅙ,ㅚ,ㅛ,ㅜ,ㅝ,ㅞ,ㅟ,ㅠ,ㅡ,ㅢ, and ㅣ)<br>27 Final Consonantal Letters ([ㄱ], [ㄲ], [ㄳ], [ㄴ], [ㄵ], [ㄶ],, [ㄷ], [ㄹ], [ㄺ], [ㄻ], [ㄼ], [ㄽ], [ㄾ], [ㄿ], [ㅀ], [ㅁ], [ㅂ], [ㅄ], [ㅅ], [ㅆ], [ㅇ], [ㅈ], [ㅊ], [ㅋ], [ㅌ], [ㅍ], and [ㅎ])<br>1 Space (S) |
| | | English | 26 Letters (a, b, c, d, e, f, g, h, i, j, k, l, m, n, o, p, q, r, s, t, u, v, w, x, y, and z)<br>n More Distinguishable Letters ([c] and [g], in addition, more letters can be added according to a pronunciation rule)<br>1 Space ($)<br>1 Symbol (') |
| Fourth Level Target Label | Composed of Letters and Spaces, and Distinction of Letters according to Silent Letter Rule and Arrangement Positions | Korean | 18 Initial Consonantal Letters (ㄱ,ㄲ,ㄴ,ㄷ,ㄸ,ㄹ,ㅁ, ㅂ,ㅃ,ㅅ,ㅆ,ㅈ,ㅉ,ㅊ,ㅋ,ㅌ,ㅍ, and ㅎ)<br>21 Medial Consonantal Letters (ㅏ,ㅐ,ㅑ,ㅒ,ㅓ,ㅔ,ㅕ, ㅖ,ㅗ,ㅘ,ㅙ,ㅚ,ㅛ,ㅜ,ㅝ,ㅞ,ㅟ,ㅠ,ㅡ,ㅢ, and ㅣ)<br>27 Final Consonantal Letters (<ㄱ>, <ㄲ>, ㄳ, <ㄴ>, ㄵ, ㄶ, <ㄷ>, <ㄹ>, ㄺ, ㄻ, ㄼ, ㄽ, ㄾ, ㄿ, ㅀ, <ㅁ>, <ㅂ>, ㅄ, <ㅅ>, <ㅆ>, <ㅇ>, <ㅈ>, <ㅊ>, <ㅋ>, <ㅌ>, <ㅍ>, and <ㅎ><br>1 Silent Letter ([ㅇ])<br>1 Space (S) |
| | | English | 26 Letters (a, b, c, d, e, f, g, h, i, j, k, l, m, n, o, p, q, r, s, t, u, v, w, x, y, and z)<br>n More Distinguishable Letters (<c> and <g>, in addition, more letters can be added according to a pronunciation rule)<br>n Silent Letters ([k]), [w], [g], and [p], in addition, more letters can be added according to a silent letter rule)<br>1 Space ($)<br>1 Symbol (') |

Descriptions of the other components of the speech recognition apparatus 100 will be continued with reference to FIG. 3 again.

The acoustic model building unit 130 learns at least one learning data set generated by the target label constructing unit 120 and builds an acoustic model 140 based on a deep neural network. Here, the deep neural network may be RNN, BRNN, LSTM, BLSTM, GRU, BGRU, or the like, but the inventive concept is not limited thereto.

The RNN is a neural network model that is cyclically connected to effectively learn a time series order of input data. Speech data is also data having a time series order and thus, learning on speech recognition may be effectively performed. Further, the BRNN is a modified RNN model for learning a time series order of input data in both directions and is a neural network model including a forward layer and a backward layer according to the learning direction. Configurations of neural networks of the RNN and the BRNN will be described with reference to FIGS. 6A and 6B.

Further, the LSTM, the BLSTM, the GRU, and the BGRU are also neural network models corresponding to the modification of the RNN. The neural network models described above are well known in the art, and thus a further description thereof will be omitted.

According to the embodiment of the inventive concept, the acoustic model building unit 130 may perform learning on the acoustic model 140 by updating a weight of the deep neural network using a connectionist temporal classification (CTC) technique. Since the CTC technique uses a loss function considering a pronunciation time of speech data, learning may be effectively performed even on pieces of speech data which indicate the same text but have different pronunciation times. Accordingly, the accuracy of speech recognition may also be improved.

According to the embodiment of the inventive concept, when a computing operation is performed by a graphic processing unit (GPU) and a processing unit other than the GPU, the acoustic model building unit 130 may control to adjust an amount of computation processed by the GPU on the basis of the number of classes which may be output in the acoustic model. In other words, as shown in Table 1, it can be seen that the number of classes of the third or fourth level target label is much greater than the number of classes of the first or second level target label. When the number of the classes is increased, the number of output nodes constituting an output layer of the deep neural network should also be increased. Therefore, when neural network learning is performed on the third or fourth level target label, the learning speed of the acoustic model may be slowed down. Particularly, in a process of adjusting the weight of the neural network, a matrix operation is frequently performed. When the number of the classes is increased, a size of a matrix is also increased and an amount of computation may also be significantly increased. Therefore, the acoustic model building unit 130 may control such that the amount of computation processed by the GPU increases as the number of the classes increases, and thus the learning speed of the acoustic model may be improved.

Table 2 below shows results of improving the learning speed by controlling the amount of computation of the GPU when learning the acoustic model using a CTC technique.

TABLE 2

| Item | Before Increasing Amount of Computation of CTC-GPU | After Increasing Amount of Computation of CTC-GPU |
|---|---|---|
| Speech Data Information | 3,000 Sentences (Average of 13 to 14 Seconds) | 3,000 Sentences (Average of 13 to 14 Seconds) |
| Learning Time per Epoch | Average of 1 Hour and 57 Seconds | Average of 57 Minutes and 33 Seconds |

Referring to Table 2, it can be seen that when the amount of computation of the GPU is controlled to be increased, a learning time per epoch is reduced by about three minutes. The above table shows that if it is assumed that it is necessary to learn an acoustic model of 1,000 epochs or more for 3,000 sentences in order to have a speech recognition rate of a certain level or more, the learning time may be reduced by 50 hours or more. When it is assumed that a large amount of speech data should be learned in order to effectively construct an acoustic model, the learning speed of the acoustic model according to the embodiment described above may be improved, and the learning time thereof may be significantly shortened.

Meanwhile, according to the embodiment of the inventive concept, the acoustic model building unit 130 may build an optimal acoustic model for each recognition target language using a k-fold cross validation technique. Accordingly, the accuracy of speech recognition may be further improved. A detailed description thereof will be described below with reference to FIG. 11.

Further, according to the embodiment of the inventive concept, the acoustic model building unit 130 may effectively build an acoustic model using a two-stage learning process. Accordingly, the accuracy of speech recognition may be further improved. A detailed description thereof will be described below with reference to FIG. 12.

Referring again to FIG. 3, the speech input unit 150 receives recognition target speech data as an input. The recognition target speech data may include all of a wave file representing a speech signal in a wave form, a spectrogram representing the wave file in a frequency form, a MFCC, and the like. The speech input unit 150 may include an input device for receiving recognition target speech data as an input, and the input device may include a microphone or the like, but the inventive concept is not limited thereto. Further, the speech input unit 150 may receive recognition target speech data as an input from a communication device such as a desktop computer, a notebook PC, a tablet PC, or the like.

The target label prediction unit 160 predicts target labels for the recognition target speech data using the built acoustic model 140. Here, a configuration of the predicted target labels corresponds to a configuration of the learned target labels. For example, when the acoustic model learned using the third level target label is used, the target label predicted by the target label prediction unit 160 also has a configuration in which arrangement positions of an initial consonant, a medial consonant, and a final consonant are distinguished.

The decoding unit 170 outputs final text by combining letters, syllables, words, and the like on the basis of the predicted target labels. In order to output the final text, the decoding unit 170 may use at least one algorithm well known in the art, and any algorithm may be used therefor.

For example, the decoding unit 170 may output the final text using a predefined word dictionary. Particularly, the decoding unit 170 may extract a plurality of candidate words from the word dictionary using the predicted target labels, and output a word having the highest probability of being combined with letters included in the predicted target labels among the plurality of candidate words as the final text.

It should be noted that the word dictionary (not shown) may be used in a variety of terms such as a language model, a linguistics model and the like in the related art, but refers to the same object. Hereinafter, an example in which the decoding unit 170 outputs the final text will be described with reference to FIG. 7.

Referring to FIG. 7, a predicted target label 411 of the acoustic model, which is obtained by learning the first level target label, and a predicted target label 413 of the acoustic model, which is obtained by learning the third level target label, are shown.

When the acoustic model is built using the first level target label, the decoding unit 170 extracts all candidate words starting from a first letter and a letter "ㄴ" that follows a letter "안" from the word dictionary and searches for the probabilities of all the candidate words. Here, it is assumed that there are n candidate words whose initial consonants of syllables next to the letter "안" are the letter "ㄴ," and that there are k candidate words whose final consonants of the letter "안" are the letter "ㄴ." Then, the decoding unit 170 compares the probabilities of (n+k) candidate words and outputs text "안녕하세요" as a final text.

Next, when the acoustic model is built using the third level target label, the decoding unit 170 knows that the letter "[ㄴ]" that follows the letter "안" is the final consonant, and thus may compare only the probabilities of k candidate words and output the text "안녕하세요" as the final text.

Among the two cases, in the case in which the third level target label to which the structural characteristics of the recognition target language are further reflected is used as the target label, it can be seen that the number of the candidate words is reduced, and accordingly, the amount of computation of the decoding unit 170 is reduced. Further, the accuracy of the speech recognition result is improved, and test results therefor will be described with reference to a graph shown in FIG. 13.

Each of the components in FIG. 3 may refer to software or hardware, such as a field programmable gate array (FPGA) or an application-specific integrated circuit (ASIC). However, the components are not limited to software or hardware, and may be configured to be in an addressable storage or configured to execute one or more processors. The functions provided in the components may be implemented by more divided components, or may be implemented by a single component which performs a specific function by combining a plurality of components.

Hereinafter, a hardware configuration of a speech recognition apparatus 100 according to still another embodiment of the inventive concept will be described with reference to FIG. 8.

Figure 8:
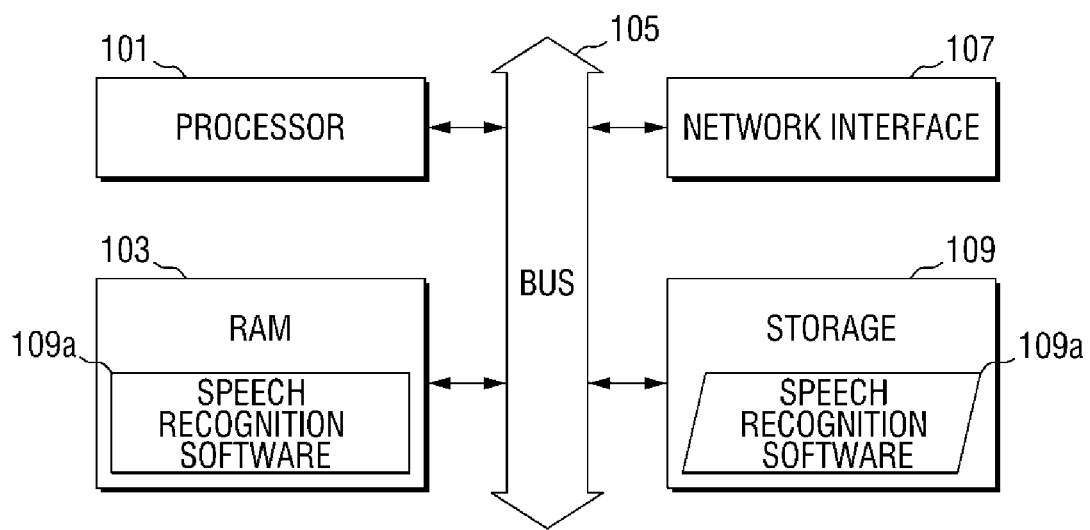
FIG. 8 is a hardware configuration diagram of a speech recognition apparatus according to still another embodiment.

Referring to FIG. 8, the speech recognition apparatus 100 may include one or more processors 101, a bus 105, a network interface 107, a memory 103 for loading computer programs executed by the processors 101, and a storage 109 for storing speech recognition software 109a. However, only components associated with the embodiment of the inventive concept are shown in FIG. 8. Therefore, it can be seen by those skilled in the art that the inventive concept may include general-purpose components other than the components shown in FIG. 8.

The processor 101 controls the overall operation of each configuration of the speech recognition apparatus 100. The processor 101 may include a central processing unit (CPU), a microprocessor unit (MPU), a micro controller unit (MCU), a GPU, or any type of processor well known in the art of the inventive concept. Further, the processor 101 may perform at least one application or operations on the programs for executing a speech recognition method according to the embodiments of the inventive concept. The speech recognition apparatus 100 may include one or more processors.

The memory 103 is configured to store various types of data, commands, and/or information. The memory 103 may load one or more programs 109a from the storage 109 to perform the speech recognition method according to the embodiments of the inventive concept. A random access memory (RAM) is shown as an example of the memory 103 in FIG. 8.

The bus 105 provides a communication function between the components of the speech recognition apparatus 100. The bus 105 may be implemented as various types of buses such as an address bus, a data bus, a control bus, and the like.

The network interface 107 supports wired and wireless Internet communication of the speech recognition apparatus 100. Further, the network interface 107 may support various communication methods other than the Internet communication. To this end, the network interface 107 may include a communication module well known in the art of the inventive concept.

The storage 109 is configured to non-temporarily store one or more programs 109a. In FIG. 8, the speech recognition software 109a is shown as an example of one or more programs 109a.

The storage 109 may include a non-volatile memory such as a read only memory (ROM), an erasable programmable ROM (EPROM), an electrically erasable programmable ROM (EEPROM), a flash memory, or the like, a hard disk, a removable disk, or may include any type of computer-readable recording medium well known in the art of the inventive concept.

The speech recognition software 109a may build a deep neural network-based acoustic model by performing the speech recognition method according to the embodiment of the inventive concept and output the final text of the recognition target speech data using the acoustic model.

Particularly, the speech recognition software 109a is loaded into the memory 103 to obtain the original learning data set for the recognition target language by one or more processors 101, and each of the original learning data included in the original learning data set may perform an operation including learning speech data and text information corresponding to the learning speech data, an operation for forming target labels by dividing the text information included in each of the original learning data in letter units, and an operation for building a deep neural network-based acoustic model by learning the learning speech data included in each of the original learning data and the target label corresponding to the learning speech data. Here, the target label may refer to, for example, at least one target label among the first to fourth level target labels described above.

Until now, the configuration and the operation of the speech recognition apparatus 100 according to the embodiment of the inventive concept have been described with reference to FIGS. 3 to 8. Next, a speech recognition method according to yet another embodiment of the inventive concept will be described in detail with reference to FIGS. 9 to 11.

Hereinafter, each operation of the speech recognition method according to the embodiment of the inventive concept described below may be performed by a computing device. For example, the computing device may be the speech recognition apparatus 100. However, for convenience of description, a description of an operation object of each operation included in the speech recognition method may be omitted. Further, each operation of the speech recognition method may be an operation performed in the speech recognition apparatus 100 by the speech recognition software 109a being executed by the processor 101.

The speech recognition method according to the embodiment of the inventive concept may include an acoustic model learning operation in which learning is performed on the acoustic model, and a speech recognition operation in which speech recognition is performed based on the learned acoustic model. Hereinafter, each of the operations will be described.

Figure 9:
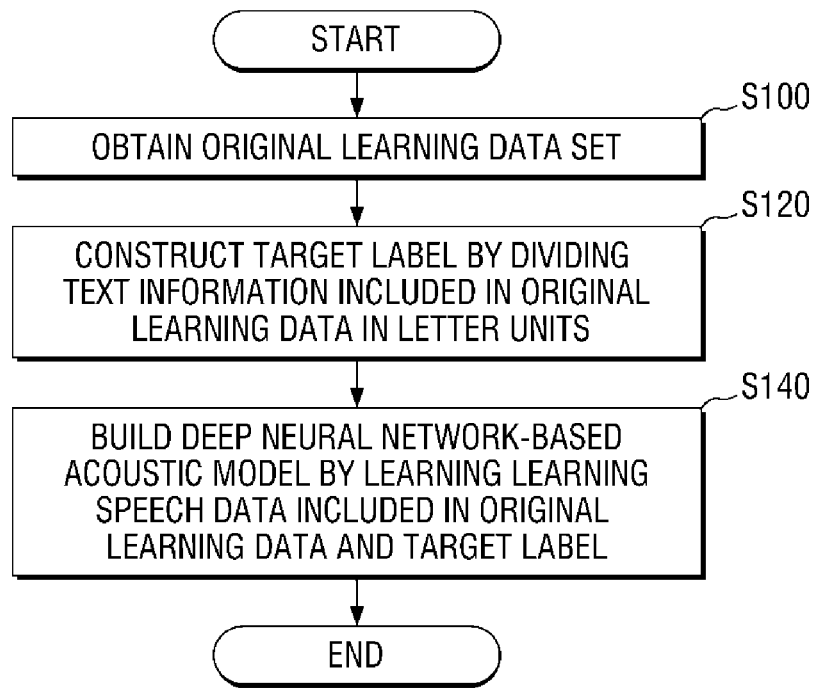
FIGS. 9 and 10 are flowcharts for describing a speech recognition method according to yet another embodiment.

FIG. 9 is a flowchart of the acoustic model learning operation. It should be understood, however, that this is only a preferred embodiment for achieving the objects of the inventive concept, and that some operations may be added or deleted as necessary.

Referring to FIG. 9, the speech recognition apparatus 100 obtains an original learning data set (S100). Here, each piece of original learning data included in the original learning data set may include learning speech data and text corresponding to the learning speech data, and the method of obtaining the original learning data set may be any method.

Next, the speech recognition apparatus 100 constructs target labels by dividing text information included in each piece of original learning data in letter units (S120). As described with reference to FIG. 4, the target labels may include, for example, a first level target label to a fourth level target label, and the speech recognition apparatus 100 may construct appropriate target labels according to a type of a recognition target language. A detailed description of the method of constructing the target labels is omitted in order to avoid redundant description.

Next, the speech recognition apparatus 100 builds a deep neural network-based acoustic model by learning the learning speech data included in each piece of original learning data and the constructed target labels (S140). Particularly, the speech recognition apparatus 100 may perform learning on the acoustic model by adjusting a weight of the deep neural network using a CTC technique to minimize a loss.

Next, an operation of performing speech recognition using the built acoustic model will be described with reference to FIG. 10.

Figure 10:
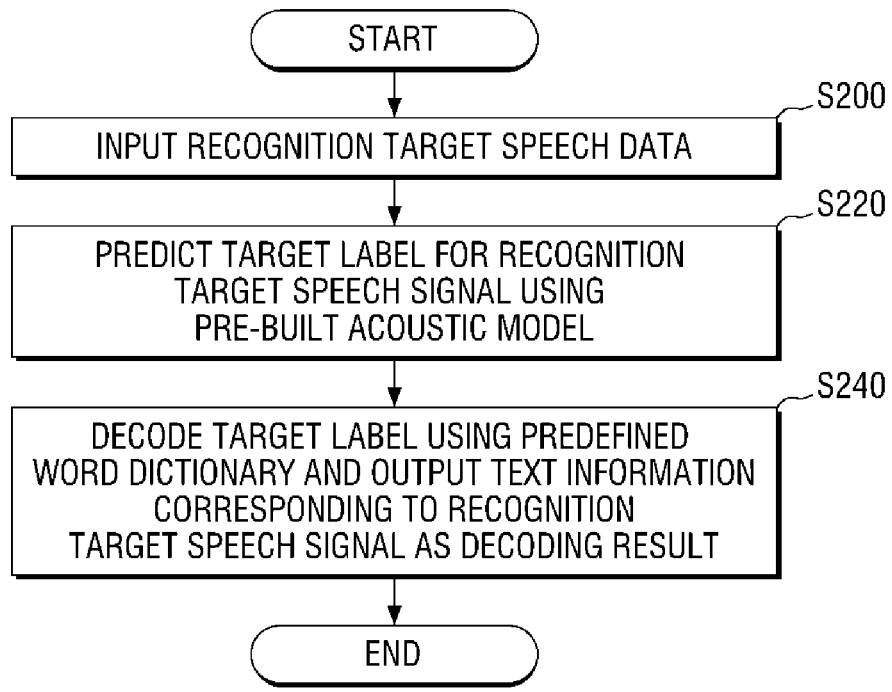

FIG. 10 is a flowchart of the speech recognition operation. It should be understood, however, that this is only a preferred embodiment for achieving the objects of the inventive concept, and that some operations may be added or deleted as necessary.

Referring to FIG. 10, the speech recognition apparatus 100 receives recognition target speech data as an input (S200). For example, the recognition target speech data may be input through a microphone embedded in the speech recognition apparatus 100 or may be received from the outside.

Next, the speech recognition apparatus 100 predicts a target label for a recognition target speech signal using the pre-built acoustic model (S220). That is, the speech recognition apparatus 100 may input the recognition target speech signal to the acoustic model and obtain the predicted target label as an output value. An example of the predicted target label is shown in FIG. 7.

Next, the speech recognition apparatus 100 decodes the predicted target label using a predefined word dictionary and outputs text information corresponding to the recognition target speech signal as a decoding result (S240). For example, the method of decoding the target label and outputting the text information may be performed based on statistical probabilities as shown in FIG. 7, but the method may also be performed in any other manner.

Until now, the speech recognition method according to the embodiment of the inventive concept has been described with reference to FIGS. 9 and 10. According to the above-described method, the corresponding text may be immediately recognized and output from the speech data without performing a pronunciation analysis process on the speech data on the basis of the learning result of the deep neural network-based acoustic model. Accordingly, the overall process for speech recognition may be simplified.

Next, a method of building an optimal acoustic model which may be referred to in some embodiments of the inventive concept will be described with reference to FIG. 11.

Since structural characteristics of a language may vary according to a recognition target language, a learning data set which is capable of providing the highest recognition rate for the recognition target language may also vary. Therefore, according to the embodiment of the inventive concept, a candidate acoustic model may be built based on each learning data set, and an optimal acoustic model for the corresponding recognition target language may be selected through an evaluation process.

Figure 11:
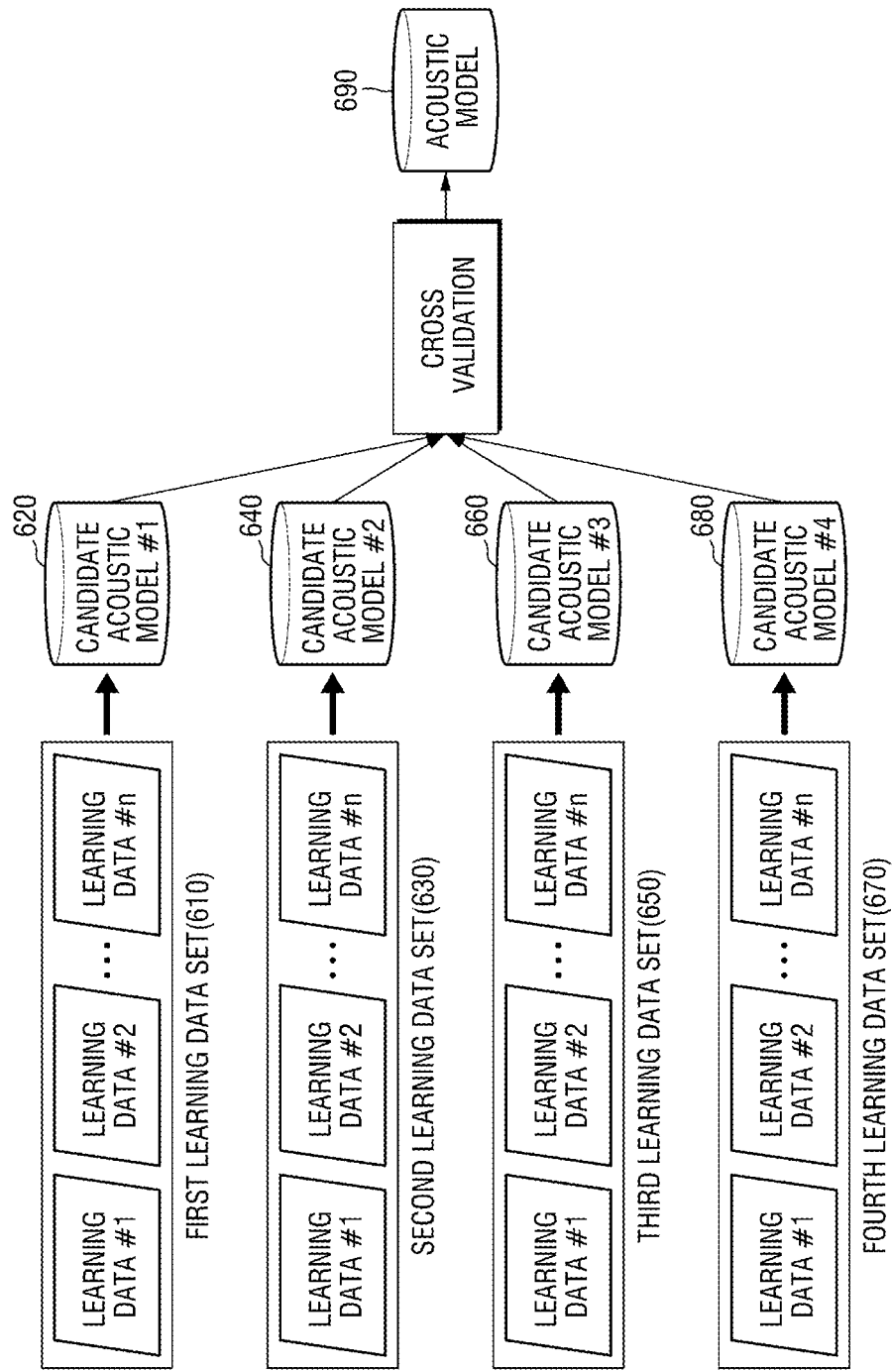
FIG. 11 is a view for describing a method of building an optimal acoustic model, which may be referred to in some embodiments.

As shown in FIG. 11, the speech recognition apparatus 100 may generate a plurality of learning data sets 610, 630, 650, and 670 each having different target labels in the original learning data set and build a plurality of candidate acoustic models 620, 640, 660, and 680 by learning the respective learning data set. In FIG. 11, the candidate acoustic models 620, 640, 660, and 680 are shown as being respectively built for the first to fourth learning data sets 610, 630, 650, and 670. However, the candidate acoustic models may be built for only some of the learning data sets in consideration of the performance of the speech recognition apparatus 100, the structural characteristics of the recognition target language, and the like.

The speech recognition apparatus 100 may select any one acoustic model 690 in which the accuracy of speech recognition satisfies a predetermined condition through an evaluation process, or may select a plurality of acoustic models as an acoustic model 690 for the corresponding recognition target language. In this case, in order to perform the evaluation process, a k-fold cross validation technique may be used, but the evaluation process may be performed in any manner. Since the k-fold cross validation technique is a technique well known in the art, a description thereof will be omitted.

According to the embodiment described above, the speech recognition apparatus 100 may select an optimal acoustic model for each of a plurality of recognition target languages. For example, a candidate acoustic model is built by learning any one of the first level target label to the fourth level target label, and then a first acoustic model for a first recognition target language may be built through an evaluation process and a second acoustic model for a second recognition target language may be built in the same manner. In this case, a configuration of the target label used for learning the first acoustic model and a configuration of the target label used for learning second acoustic model may be different from each other. For example, the first acoustic model may be an acoustic model based on the second level target label, and the second acoustic model may be an acoustic model based on the third level target label. This is because the structural characteristics may be different according to the recognition target language, such that the optimal acoustic model may also vary.

Until now, the method of building the optimal acoustic model which may be referred to in some embodiments of the inventive concept has been described with reference to FIG. 11. According to the above-described method, the optimal acoustic model may be built for each recognition target language, and thus the accuracy of speech recognition may be further improved.

Next, a method of learning an acoustic model which may be referred to in some embodiments of the inventive concept will be described with reference to FIG. 12.

Figure 12:
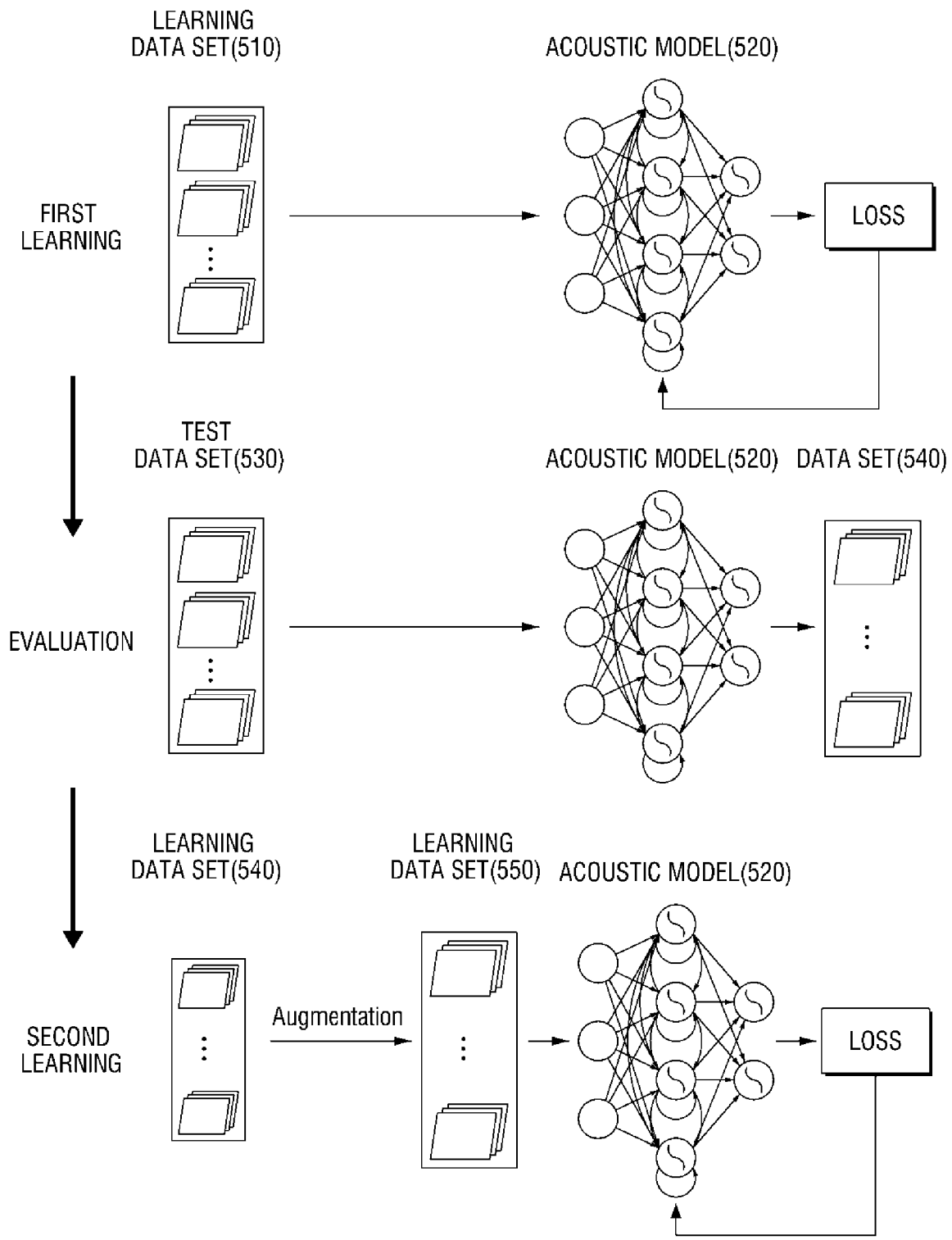
FIG. 12 is a view for describing a method of learning an acoustic model, which may be referred to in some embodiments.

According to the embodiment of the inventive concept, the speech recognition apparatus 100 may effectively build an acoustic model by a two-stage learning process as shown in FIG. 12. In a first-stage learning process, first learning may be performed on an acoustic model 520 using a learning data set 510. Here, the learning data set 510 may be any one of first to fourth learning data sets.

Next, before a second-stage learning process is performed, an evaluation process may be performed on the first learned acoustic model 520. In the evaluation process, for each piece of test data included in a test data set 530, an error of the first learned acoustic model may be calculated, and test data whose error is greater than or equal to a preset value may be selected from the test data set 530. A data set 540 shown in FIG. 12 refers to a set of selected test data.

Next, in the second-stage learning process, second learning may be performed on the acoustic model 520 using the data set 540 as a learning data set 540. In this case, in order to increase the number of learning data sets 540, a data augmentation technique may be used. That is, the speech recognition apparatus 100 may modify speech data included in the learning data set 540 and generate a plurality of speech data to generate a learning data set 550 in which the number of pieces of data is increased.

For example, when it is assumed that learning data included in the learning data set 540 is composed of first speech data and a target label for the first speech data, the speech recognition apparatus 100 may generate second speech data by synthesizing noise to the first speech data and may increase the number of pieces of learning data by adding the learning data composed of the second speech data and a target label to the learning data set 550. In addition, the speech recognition apparatus 100 may generate new learning data by modifying the first speech data using various methods.

Until now, the method of learning the acoustic model which can be referred to in some embodiments of the inventive concept has been described with reference to FIG. 12. According to the above-described method, the test data having low accuracy of speech recognition may be selected in the evaluation process of the acoustic model, and re-learning may be performed using the selected test data as the learning data. Further, additional learning data may be secured by data augmentation for the selected test data. Accordingly, the learning of the acoustic model may be more effectively performed, and the accuracy of speech recognition may be further improved.

Figure 13:
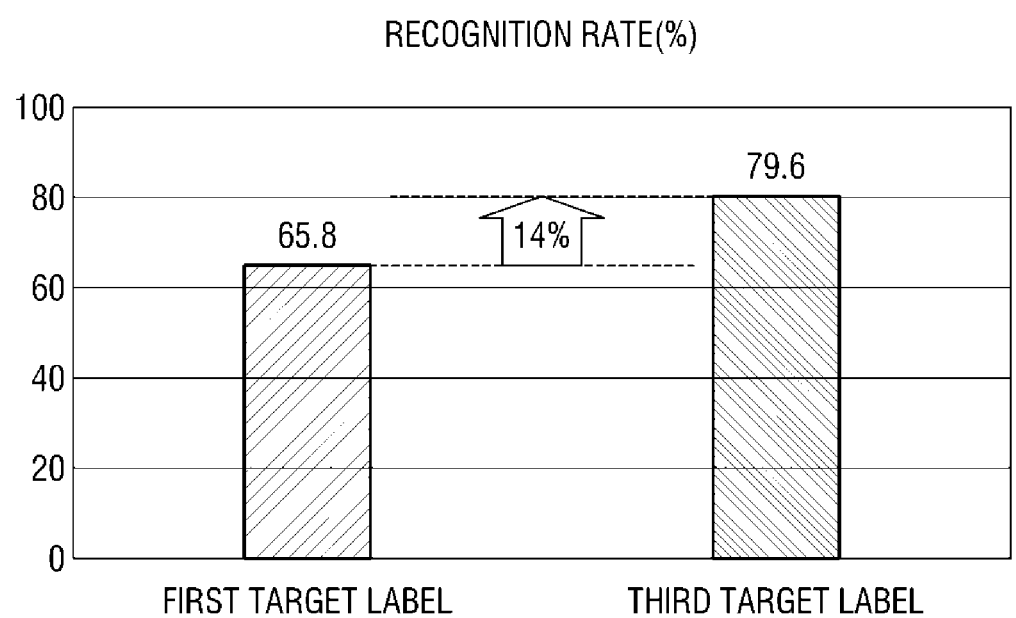
FIG. 13 is a view showing performance test results according to a target label construction.

Finally, test results on the change of speech recognition performance according to the target label configuration will be briefly described with reference to FIG. 13. In FIG. 13, speech recognition results are shown of an acoustic model learned with a first level target label and a second acoustic model learned with a third level target label when a recognition target language is Korean.

Referring to FIG. 13, it can be confirmed that a deep neural network-based acoustic model which learns a target label composed of the third level target label has an improved recognition rate of about 14% more than an acoustic model which learns a target label composed of the first level target label.

As described above, it can be confirmed that when the target label is constructed and learned so that the structural characteristics of Korean that form syllables by being combined with a combination of initial, medial, and final consonants, the accuracy of end-to-end speech recognition is improved.

The concepts of the invention described above with reference to FIGS. 1 to 13 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A speech recognition method, performed by a speech recognition apparatus, for a recognition target language, the speech recognition method comprising:
    obtaining an original learning data set for the recognition target language, wherein each piece of original learning data included in the original learning data set includes learning speech data and text information corresponding to the learning speech data;
    constructing a target label by dividing the text information included in the each piece of original learning data into letters; and
    building an acoustic model based on a deep neural network by learning the learning speech data included in the each piece of original learning data and the target label corresponding to the learning speech data,
    wherein the constructing of the target label includes:
        constructing a first level target label such that, among the divided letters, different letters are defined as different classes;
        constructing a second level target label such that, among the divided letters, different letters are defined as different classes and an un-pronounced letter and a pronounced letter, even in the case of being the same letter, are defined as different classes;
        constructing a third level target label such that, among the divided letters, different letters are defined as different classes and the same letters having different arrangement positions are defined as different classes; and
        constructing a fourth level target label such that, among the divided letters, different letters are defined as different classes, an un-pronounced letter and a pronounced letter, even in the case of being the same letter, are defined as different classes, and the same letters having different arrangement positions are defined as different classes.

2. The speech recognition method of claim 1, wherein the target label includes a space included in the text information, and
    wherein the space is defined as a separate class in the acoustic model.

3. The speech recognition method of claim 1, wherein, among the same letters included in the target label, a pronounced letter and an un-pronounced letter are defined as different classes in the acoustic model.

4. The speech recognition method of claim 1, wherein the building the acoustic model comprises updating a weight of the deep neural network constituting the acoustic model using a connectionist temporal classification (CTC) technique.

5. The speech recognition method of claim 1, wherein the deep neural network includes at least one of a recurrent neural network (RNN), a bi-directional RNN (BRNN), a long short term memory (LSTM), a bi-directional LSTM (BLSTM), a gated recurrent unit (GRU), and a bi-directional GRU (BGRU).

6. The speech recognition method of claim 1, wherein:
    the recognition target language is Korean; and
    a consonant of which an arrangement position is an initial consonant position and a consonant of which an arrangement position is a final consonant position among the same consonants included in the target label are defined as different classes in the acoustic model.

7. The speech recognition method of claim 6, further comprising:
    receiving recognition target speech data as an input;
    generating a predicted target label for the recognition target speech data using the acoustic model, wherein the predicted target label includes a first consonant of which an arrangement position is a final consonant position;
    extracting a candidate word associated with the predicted target label from a predefined word dictionary; and
    outputting recognized text information corresponding to the recognition target speech data based on the candidate word,
    wherein the candidate word includes only words in which the first consonant is located at the final consonant position.

8. The speech recognition method of claim 1, wherein the building the acoustic model comprises learning the acoustic model using a graphics processing unit (GPU) and a processor other than the GPU, and
    wherein an amount of computation processed by the GPU increases as a number of classes defined in the acoustic model increases.

9. The speech recognition method of claim 1, wherein the building the acoustic model comprises:
- building a plurality of candidate acoustic models by learning the learning speech data included in the each piece of original learning data and at least two target labels of the first level target label to the fourth level target label corresponding to the learning speech data;
- evaluating the plurality of candidate acoustic models using a k-fold cross validation technique; and
- determining an acoustic model for the recognition target language among the plurality of candidate acoustic models based on an evaluated result.

10. The speech recognition method of claim 1,
wherein the recognition target language includes a first recognition target language and a second recognition target language,
wherein the building of the acoustic model comprises:
- building a first acoustic model for the first recognition target language by learning the learning speech data included in the each piece of original learning data and at least one target label selected from the first level target label to the fourth level target label corresponding to the learning speech data, and
- building a second acoustic model for the second recognition target language by learning the learning speech data included in the each piece of original learning data and at least one target label selected from the first level target label to the fourth level target label corresponding to the learning speech data, and
wherein a configuration of the target label used for learning the first acoustic model and a configuration of the target label used for learning the second acoustic model are different from each other.

11. The speech recognition method of claim 1, wherein the building the acoustic model comprises:
- performing first learning on the acoustic model using the learning speech data included in the each piece of original learning data and the target label corresponding to the learning speech data;
- calculating an error value of the first learned acoustic model for each piece of test data included in a test data set;
- selecting test data having the error value greater than or equal to a predetermined value from the test data set and generating a new learning data set using the selected test data; and
- performing second learning on the acoustic model using the new learning data set.

12. The speech recognition method of claim 11, wherein the selected test data is composed of first test speech data and a first target label corresponding to the first test speech data, and
wherein the generating the new learning data set comprises:
- modifying the first test speech data and generating second test speech data, and
- adding the selected test data, the second test speech data, and the data composed of the first target label to the new learning data set.

13. The speech recognition method of claim 12, wherein the generating the second test speech data comprises generating the second test speech data by synthesizing noise to the first test speech data.

* * * * *